June 11, 1968     R. P. GILLIS ET AL     3,388,039
APPARATUS FOR FORMING ASBESTOS CEMENT PIPES
Filed Dec. 30, 1964     2 Sheets-Sheet 1
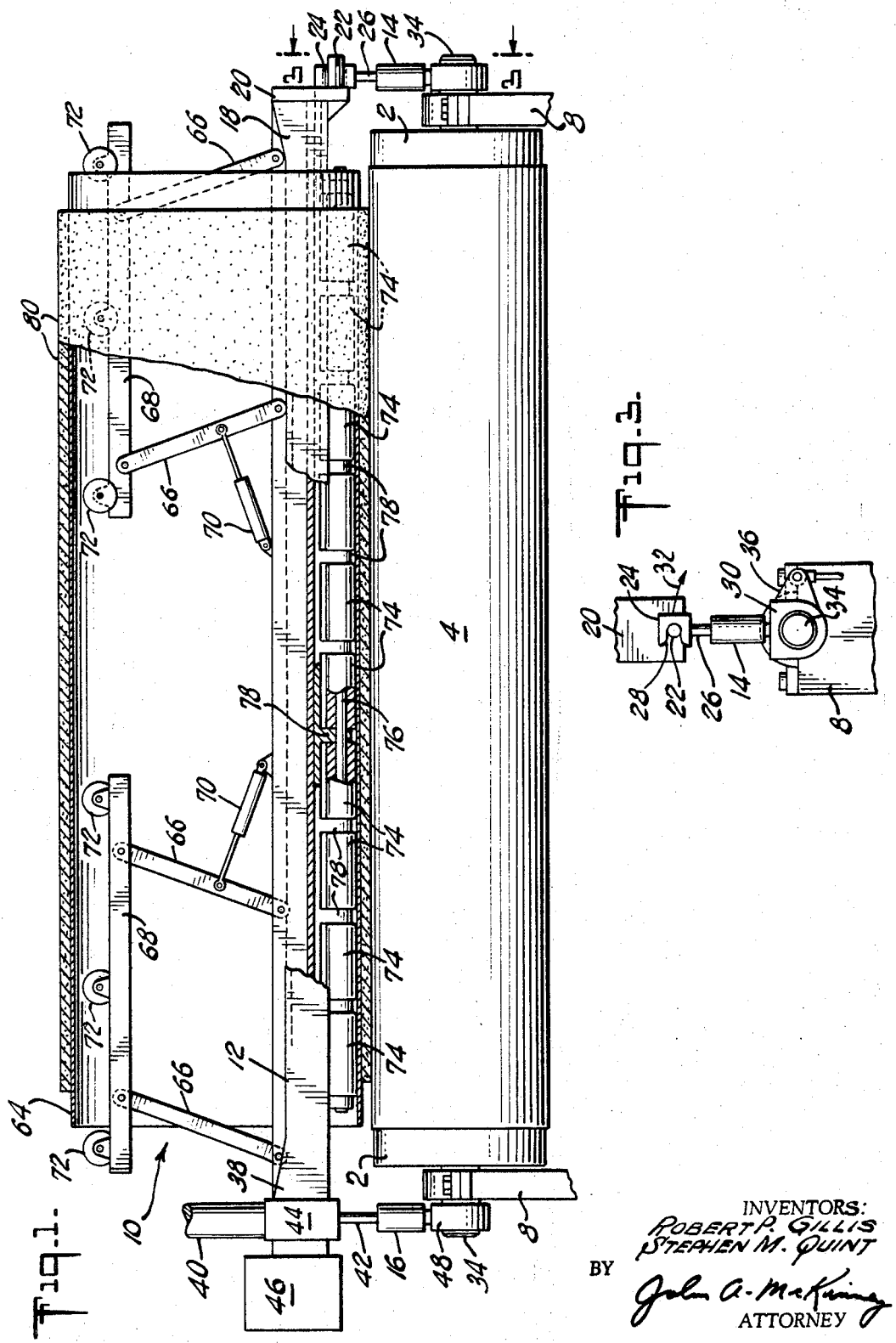
INVENTORS:
ROBERT P. GILLIS
STEPHEN M. QUINT
BY
John A. McKining
ATTORNEY June 11, 1968   R. P. GILLIS ET AL   3,388,039
APPARATUS FOR FORMING ASBESTOS CEMENT PIPES
Filed Dec. 30, 1964   2 Sheets-Sheet 2
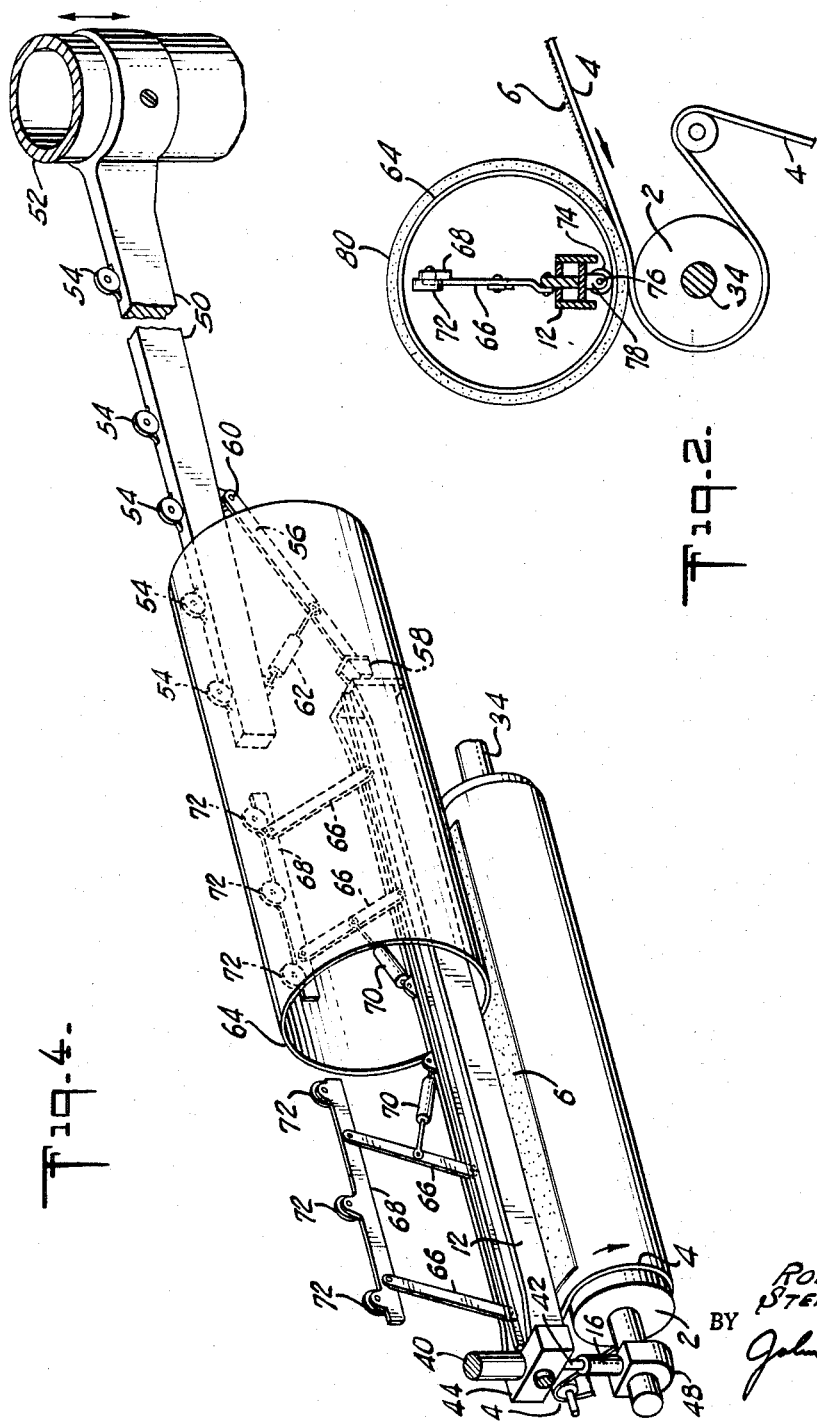
INVENTORS:
ROBERT P. GILLIS
STEPHEN M. QUINT
BY John A. McKinney
ATTORNEY United States Patent Office 3,388,039
Patented June 11, 1968

3,388,039
APPARATUS FOR FORMING ASBESTOS
CEMENT PIPES
Robert P. Gillis, Somerville, and Stephen Mark Quint, Basking Ridge, N.J., assignors to Johns-Manville Corporation, New York, N.Y., a corporation of New York
Filed Dec. 30, 1964, Ser. No. 422,263
2 Claims. (Cl. 162—284)

ABSTRACT OF THE DISCLOSURE

A system for manufacturing asbestos-cement pipe by laminating asbestos-cement material on an elastic mandrel while applying the pipe forming pressure to the inner surface of the material.

This invention relates to method and apparatus for forming tubes and in particular to method and apparatus for forming tubes of asbestos-cement. More specifically, the invention relates to method and apparatus for applying pressure to the laminations of asbestos-cement pulp on a mandrel and includes the formation of such tubes on elastic mandrels which may comprise a relatively flexible material and which mandrels may be removed after the tube has been formed or may remain associated with the tube for indefinite periods of time. Although described specifically in relation to the formation of tubes of asbestos-cement, it is to be understood that the invention may be utilized in the formation of tubes from other materials and has particular advantage where it is desired to exert a pressure on the laminations of a material on a mandrel while these laminations are being formed on the mandrel.

One of the conventional methods of forming tubes of asbestos-cement, such as asbestos-cement pipe, involves the winding of a wet sheet of asbestos-cement pulp on a rotating, hollow mandrel while applying a pressure thereto. As disclosed in U.S. Patent No. 3,000,776 to J. H. Swensen, one method for applying pressure to the laminations of asbestos-cement pulp on the mandrel comprises a plurality of rubber covered press rolls. As is evident from the disclosure in Swensen, it is necessary in this type of apparatus to employ mandrels which have relatively heavy walls so as to be able to withstand the relatively high pressure exerted on these mandrels by the press rolls. In one of the normal methods of producing asbestos-cement pipe, the loosening and removal of the pipe from the mandrel involves an extended period of time, and a manufacturer has to maintain a large number of mandrels for each size of pipe. This is an expensive but heretofore necessary practice in the commercial manufacture of asbestos-cement pipe.

In the past few years, many efforts have been directed to method and apparatus for providing pipe, such as asbestos-cement pipe, with a lining of a particular type of material so as to provide pipe for a desired type of service. When manufacturing asbestos-cement pipe, as set forth above, this lining material is applied and secured to the asbestos-cement pipe after it has been formed. This additional operation requires additional handling of the pipe and in many instances much difficulty has been encountered in properly lining the pipe.

It is an object of this invention to provide method and apparatus for forming tubes on a mandrel including the application of pressure to the tube through the interior surface of the mandrel while the tube is being formed on the mandrel.

It is a further object of the invention to provide method and apparatus for forming tubes wherein the tube is formed on a relatively light weight elastic mandrel comprising a relatively flexible material.

The foregoing objects are accomplished in accordance with the instant invention by a system wherein a mandrel is placed in position over an anvil roll which is mounted for rotation in fixed supports. Means comprising a beam having a plurality of rollers mounted thereon is positioned within the mandrel and this beam is adapted to apply a force to the mandrel tending to move the mandrel toward the anvil roll. A conveyor belt carrying a sheet of wet asbestos-cement pulp is arranged so as to pass between the anvil roll and the mandrel. In forming the tube of asbestos-cement, pressure applying means are actuated so as to move the rollers into contact with a portion of the inner peripheral surface of the mandrel so as to urge the mandrel toward the anvil roll. The rotation of the roll, the movement of the belt and the rotation of the mandrel is then initiated. The sheet of asbestos-cement pulp carried by the conveyor belt passes between the anvil roll and the mandrel and is laminated as a plurality of layers on the mandrel. As the laminations are formed on the mandrel, pressure is applied thereto by the urging of the mandrel toward the anvil roll by the application of suitable pressures on a portion of the interior surface of the mandrel. When the desired wall thickness has been reached, the apparatus is stopped and the mandrel with the tube of asbestos-cement formed therein is removed from the apparatus. A new mandrel is positioned over the anvil roll and the process repeated.

The application of the pressure from within the mandrel, as described above, allows for the utilization of mandrels which have relatively thin side walls. The mandrels may be readily formed from a light weight, relatively flexible material so long as the mandrels are sufficiently elastic so that, if deformed when passing between the pressure applying means and the anvil roll, the mandrel has the ability to resile into its original configuration after it has passed therethrough. This means that the mandrels may be comprised of a variety of materials, such as light weight steel, many types of plastic, other types of cement pipe, cardboard, or many other types of material. Thus, if desired, the mandrel may comprise a material of the type desired as a lining for an asbestos-cement pipe. After the formation of a pipe on such a mandrel, there is no need to remove the mandrel from the pipe. The resulting product, formed from one instead of many operations, is an asbestos-cement pipe lined with a desired type of material.

The invention will be more fully understood and further objects and advantages thereof will become apparent when reference is made to the following detailed description of a preferred embodiment of the invention and the accompanying drawings in which:

FIG. 1 is a front elevation with parts in section of a portion of the forming section of an asbestos-cement pipe machine made in accordance with the instant invention;

FIG. 2 is a side elevation of FIG. 1 with parts removed;

FIG. 3 is a side elevation of a portion of the pressure applying means; and

FIG. 4 is a pictorial view of the apparatus for feeding a mandrel into position over the anvil roll.

Referring to the drawing, there is illustrated in FIG. 1 conventional apparatus for forming a pipe on a mandrel and in the preferred embodiment of the invention comprises an anvil roll 2 over which there travels a felt 4 carrying a wet stock 6 of asbestos, cement, water and other materials which stock is deposited thereon by conventional apparatus (not shown) such as a cylinder mold or molds of the type illustrated in Rembert, U.S. Patent No. 2,322,592. The anvil roll 2, a rigid element capable of withstanding pipe forming pressures without flexing, is mounted for rotation in fixed supports 8 and is rotated by conventional means (not shown) to drive the felt 4 in the direction indicated by the arrow.

Positioned above the anvil roll 2 is a press section 10 which may be moved toward and away from the anvil roll. As illustrated in FIG. 1, the press section comprises a beam 12 which moves toward and away from the anvil roll 2 in response to the actuation of the hydraulic cylinders 14 and 16 which are supported on the fixed supports 8. It is understood that the cylinders 14 and 16 may be actuated by other means such as air. The end 18 of the beam 12 is provided with a plate 20 to which is secured a stud 22 which serves as part of the means connecting the end 18 of the beam 12 to the hydraulic cylinder 14. This means is illustrated particularly in FIG. 3 and comprises a catch plate 24 mounted on one end of the piston 26 of the cylinder 14. The catch plate 24 is provided with a notch 28 which is adapted to straddle the stud 22. As illustrated in FIG. 3, the means, including the cylinder 14 and the catch plate 24, is mounted on the base 30 for pivotal movement in the direction indicated by the arrow 32 about the pivot 34 which is secured to the fixed support 8. The pivotal movement of the base 30 about the pivot 34 is controlled by any conventional mechanism such as the pivotal lever arm assembly 36.

The other end 38 of the beam 12 is secured to the beam handling arm 40 which is mounted in conventional mechanisms (not shown) so as to be capable of rotation about an axis which extends substantially perpendicular to the longitudinal axis of the beam 12 and the anvil roll 2. Also, the beam handling arm 40 may be moved linearly toward and away from the hydraulic cylinder 16. Accordingly, the piston 42 of the hydraulic cylinder 16 is connected to the end block 44 of the beam handling arm 40. A suitable counter weight 46, the weight of which may be varied by any appropriate means to accommodate different diameters of pipe, is connected to the beam handling arm 40 on the side opposite the beam 12. The hydraulic cylinder 16 is mounted by block 48 to the fixed support 8.

The mechanism for moving mandrels into the proper position over the anvil roll 2 may comprise any number of mechanical devices one of which is illustrated particularly in FIG. 4. A cantilevered arm 50 is secured to a rod 52 which is mounted in conventional means (not shown) so as to rotate about an axis which extends substantially perpendicular to the longitudinal axis of the beam 12 and the anvil roll 2 and to move linearly in directions substantially parallel to the movement of the beam handling arm 40. The upper surface of the arm 50 is provided with a plurality of rolls 54. A lever 56 having a latch mechanism 58 at the free end thereof is pivotally secured at 60 to the bottom surface of the arm 50. The movement of the lever 56 toward and away from the bottom surface of the arm 50 is controlled by the hydraulic means 62. The beam 12 cooperates with the arm 50 in positioning a mandrel 64 over the anvil roll 2 through a pair of parallel arm linkages 66 secured to the upper surface of the beam 12. As illustrated in FIG. 4, each parallel arm linkage 66 is provided with an arm 68 which is moved toward and away from the beam 12 by the linkage so that the arms 68 always remain parallel to the upper surface of the beam 12. The movement of arms 68 is controlled by the hydraulic means 70. Each arm 68 is provided with a plurality of rollers 72 to cooperate in the positioning of the mandrel 64 as described below.

The beam 12 is also provided with a plurality of rolls 74 which are mounted on a rod 76 passing through a plurality of lugs 78 depending from the bottom surface of the beam. The rolls 74 cooperate with the hydraulic cylinders 14 and 16 in applying pressure to a portion of the inner surface of the mandrel 64 to urge the mandrel 64 toward the anvil roll 2. It is understood that other means may be employed to apply force to the beam 12 so as to apply pressure to a portion of the inner surface of the mandrel 64 to urge the mandrel 64 toward the anvil roll 2.

In operation, a mandrel 64 is loaded onto the arm 50 while the arm 50 is positioned in a direction perpendicular to the axis of the anvil roll 2 so that the mandrel 64 rests on the rollers 54. The mandrel 64 is moved over the arm 50 a sufficient distance so that the end of the latch 58 extends out of the one axial extremity of the mandrel. The rod 52 is rotated to swing the arm 50 and therefore the mandrel 64 around so that the longitudinal axis of the mandrel 64 extends generally parallel to the longitudinal axis of the anvil roll 2. When the arm 50 has moved to this position, the latch 58 is moved by the hydraulic means 62 into contact with the stud 22 so as to support the end 18 of the beam 12. The member 30 and hydraulic cylinder 14 are then rotated so as to move the catch 24 away from the stud 22 so as to provide clearance for the passage of the bottom portion of the mandrel 64 between the hydraulic cylinder 14 and the end 18 of the beam 12. The parallel arm linkages 66 are adjusted by the means 70 so that the rollers 72 on the arms 68 are level and aligned with the rolls 54. The mandrel 64 is then moved over the rolls 54 and rollers 72 until it is positioned directly above the anvil roll 2. Member 30 and the hydraulic cylinder 14 are then rotated back to their original position wherein the stud 22 is seated in the notch 28 of the catch 24. The lever 56 is moved by the mechanism 62 to lower the latch 58 away from the stud 22. The parallel arm linkages 66 are then actuated to move the arms 68 toward the anvil roll 2 and allow the mandrel to rest thereon and the arms 68 continue to move until the rollers 72 have moved out of contact with the mandrel 64. When the mandrel has come to rest on the anvil roll, the hydraulic cylinders 14 and 16 are actuated to apply pressure urging the mandrel 64 toward the anvil roll 2. Suitable means are then actuated to rotate the anvil roll 2, move the conveyor belt 4 and rotate the mandrel 64. As the conveyor belt 4 moves between the anvil roll 2 and the mandrel 64, the layer of asbestos-cement pulp 6 carried by the conveyor belt 4 is transferred to the mandrel 64. The rotation of the mandrel 64 is continued until a pipe 80 having a desired wall thickness has been formed on the mandrel. During the lamination of the wet asbestos-cement pulp of the mandrel 64, pressure is applied thereto by the action of the hydraulic cylinders 14 and 16 urging the beam 12 toward the anvil roll 2. The rolls 74 in contact with the lower inner surface of the mandrel 64 urge the mandrel 64 toward the most adjacent portion of the anvil roll 2 so that the desired amount of pressure is imposed upon the laminations on the mandrel as it passes between the adjacent portions of the mandrel 64 and the anvil roll 2. After the pipe has been formed, the hydraulic cylinders 14 and 16 are actuated to move the beam 12 in a direction away from the anvil roll 2 so that the mandrel 64 with the pipe 80 bonded thereto is supported by the rollers 72. The lever 56 is moved so that the latch 58 contacts the stud 22 and the member 30 and hydraulic cylinder 14 are rotated out of the way. Then the mandrel 64 with the pipe 80 thereon is moved over the rollers 72 onto the rolls 54 and arm 50 is rotated by the rod 52 so that the mandrel 64 with the pipe 80 thereon may be removed from the arm 50. The process is then repeated so that tubes of asbestos-cement may be formed on a plurality of mandrels.

In accordance with the instant invention, it is now possible to form asbestos-cement pipe by laminating a plurality of layers of wet asbestos-cement pulp on an elastic mandrel comprising a relatively thin and flexible material. The mandrels are described as being elastic meaning that if a portion of the mandrel is deformed while passing between the rolls 74 and the anvil roll 2, it will resile to its original configuration after passing therebetween. The asbestos-cement pipe may be formed with the desired density and strength characteristics normally associated with such pipe, since the same amount of pressure may be applied to the laminations while the layers are being formed on the mandrel. Thus, the mandrels for use in the instant invention may be formed from conventional plastic such as ABS (acrylonitrile-butadiene-styrene), PVC (polyvinylchloride), polyethylene, fiber reinforced plastic pipe, steel tubes, cardboard tubes, or any other similar type of material. When forming pipe in accordance with the instant invention, one has the option either to remove the pipe from the mandrel after the formation thereof has been completed or to leave the mandrel permanently secured to the pipe. Thus, if it is desired to produce an asbsestos-cement pipe having a steel liner, the asbestos-cement pipe could be formed on an elastic tube of relatively thin stainless steel and then the asbestos-cement pipe and tube could be left bonded together so as to produce the desired product. The same procedure could be used to produce asbestos-cement pipe with a liner of any type of material. Also, the instant invention allows the formation of relatively large diameter pipe without incurring the large expenses of the heavy rigid mandrels normally associated with such operations. Therefore, asbestos-cement pipe having diameters exceeding 36 inches may be readily formed on apparatus made in accordance with the instant invention.

The instant specification has described the making of asbestos-cement pipe where only one press section has been used. It is to be understood, that if desired, a second press section could be located on the other side of the anvil roll 2 such that it would be spaced 180° away from the beam 12 so as to be able to form a pipe on a mandrel positioned between the anvil roll 2 and the second press section while the pipe formed at the first press section was being removed from the apparatus. Also, although the invention has been particularly described in relation to the formation of asbestos-cement pipe, it is to be understood that the inventive concepts may be readily employed in the formation of pipe from other materials.

While the invention has been described in rather full detail, it will be understood that these details need not be strictly adhered to and that various changes and modifications may suggest themselves to one skilled in the art, all falling within the scope of the invention as defined by the subjoined claims.

What we claim is:
1. In the manufacture of asbestos-cement pipe wherein a mandrel is supported on an anvil roll and a conveyor carrying a continuous sheet of wet asbestos-cement stock passes between the mandrel and the anvil roll and wherein the continuous sheet of wet asbestos-cement stock is wound around the mandrel to form a plurality of laminations thereon and wherein the asbestos-cement stock on the mandrel is condensed by pressure means exerting on the stock a pipe forming pressure of at least about 300 pounds per foot of pipe length, the improvement comprising:
   (a) a hollow, elastic, relatively thin walled mandrel comprising a relatively lightweight and flexible material rotatably supported on said anvil roll with the longitudinal axes of said anvil roll and said mandrel substantially parallel to each other, and
   (b) means for applying a force to the inner surface of said mandrel to urge said mandrel toward the most adjacent portion of the outer surface of said anvil roll so as to apply pipe forming pressure to the wet asbestos-cement stock being laminated on said mandrel.
2. The improvement as defined in claim 1 wherein said means for applying a force to the inner surface of the mandrel comprises:
   (a) a beam within said mandrel extending generally parallel to the longitudinal axis on said mandrel,
   (b) a plurality of freely rotatable rollers depending from said beam and contacting, successive portions of the inner peripheral surface of said mandrel, and
   (c) means for applying a force to said beam to move said rollers into contact with said mandrel and to urge said mandrel toward said anvil roll.

References Cited
UNITED STATES PATENTS
1,330,886 2/1920 Macbeth et al. ____ 156—457 X
3,111,452 11/1963 Ewing et al. _____ 162—284 X
3,290,199 12/1966 Willhoite _____ 156—293 X

FOREIGN PATENTS
898,391 11/1953 Germany.

S. LEON BASHORE, *Primary Examiner.*